United States Patent
Zhang et al.

(10) Patent No.: US 10,292,151 B2
(45) Date of Patent: *May 14, 2019

(54) METHOD FOR RESOURCE ALLOCATION AND BASE STATION

(71) Applicant: Huawei Technologies Co., Ltd., Shenzhen (CN)

(72) Inventors: Wurong Zhang, Beijing (CN); Rong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,052

(22) Filed: Oct. 19, 2017

(65) Prior Publication Data
US 2018/0042006 A1 Feb. 8, 2018

Related U.S. Application Data

(63) Continuation of application No. 14/271,093, filed on May 6, 2014, now Pat. No. 9,826,521, which is a (Continued)

(30) Foreign Application Priority Data

Nov. 7, 2011 (CN) .......................... 2011 1 0348296

(51) Int. Cl.
*H04W 72/04* (2009.01)
*H04L 5/00* (2006.01)
(Continued)

(52) U.S. Cl.
CPC ....... *H04W 72/0426* (2013.01); *H04L 5/0066* (2013.01); *H04W 52/367* (2013.01);
(Continued)

(58) Field of Classification Search
CPC ....... H04B 7/0615; H04B 7/0667; H04J 3/00; H04L 5/00; H04L 5/0016; H04W 72/04; H04W 72/0426; H04W 72/10
See application file for complete search history.

(56) References Cited

U.S. PATENT DOCUMENTS 6,529,496 B1 * 3/2003 Yeom ................... H04B 7/0667
370/345
2008/0176523 A1 7/2008 Sutton et al.
(Continued)

FOREIGN PATENT DOCUMENTS

CN 101026577 A 8/2007
CN 101977443 A 2/2011
(Continued)

OTHER PUBLICATIONS

U.S. Appl. No. 14/271,093, filed May 6, 2014, Patented.
(Continued)

*Primary Examiner* — George C Atkins
(74) *Attorney, Agent, or Firm* — Leydig, Voit & Mayer, Ltd.

(57) ABSTRACT

A method for resource allocation includes: a base station determining a user equipment UE to which a resource block is to be allocated; and if the index number of any resource block among the allocated resource blocks of the UE falls within a preset first index number range, judging whether the number of the allocated resource blocks of the UE is less than the preset first parameter value.

12 Claims, 7 Drawing Sheets

---

401

If the number of the allocated resource blocks of the UE is greater than the preset first parameter value, then judging whether the number of the allocated resource blocks of the UE is greater than a difference value between a preset second parameter value and a current scheduling granularity of the base station

402

If the number of the allocated resource blocks of the UE is greater than the difference value between the preset second parameter value and the current scheduling granularity of the base station, then stopping allocating resource blocks to the UE; or, deleting a resource block, the index number of which falls within the preset second index number range, from the allocated resource blocks of the UE, so that the base station continues to allocate resource blocks to the UE

Related U.S. Application Data continuation of application No. PCT/CN2012/084207, filed on Nov. 7, 2012.

(51) Int. Cl.
*H04W 72/12* (2009.01)
*H04W 52/36* (2009.01)
*H04W 52/14* (2009.01)

(52) U.S. Cl.
CPC ....... *H04W 72/1247* (2013.01); *H04L 5/0007* (2013.01); *H04L 5/0044* (2013.01); *H04W 52/146* (2013.01)

(56) References Cited

U.S. PATENT DOCUMENTS

| | | | |
|---|---|---|---|
| 2010/0029289 A1 | 2/2010 | Love et al. | |
| 2010/0074209 A1 | 3/2010 | Montojo et al. | |
| 2010/0226337 A1* | 9/2010 | Yang | H04B 7/0615 370/330 |
| 2011/0096745 A1* | 4/2011 | Ahn | H04L 5/0016 370/329 |
| 2011/0134892 A1* | 6/2011 | Shirakabe | H04W 72/10 370/336 |

FOREIGN PATENT DOCUMENTS

| | | |
|---|---|---|
| CN | 102045826 A | 5/2011 |
| CN | 102098785 A | 6/2011 |
| CN | 102106178 A | 6/2011 |
| CN | 102215593 A | 10/2011 |
| CN | 102224755 A | 10/2011 |
| EP | 2334130 A1 | 6/2011 |
| JP | 2011097583 A | 5/2011 |
| WO | 2010051662 A1 | 5/2010 |
| WO | 2010082888 A1 | 7/2010 |
| WO | 2010112066 A1 | 10/2010 |

OTHER PUBLICATIONS

Pending U.S. Appl. No. 15/714,286, filed Sep. 25, 2017.
"3rdGeneration Partnership Project; Technical Specification Group Radio Access Network; Evolved Universal Terrestrial Radio Access (E-UTRA); User Equipment (UE) radio transmission and reception (Release 10)," 3GPP TS 36.101, V10.4.0, pp. 1-242, 3rd Generation Partnership Project, Valbonne, France (Sep. 2011).

* cited by examiner

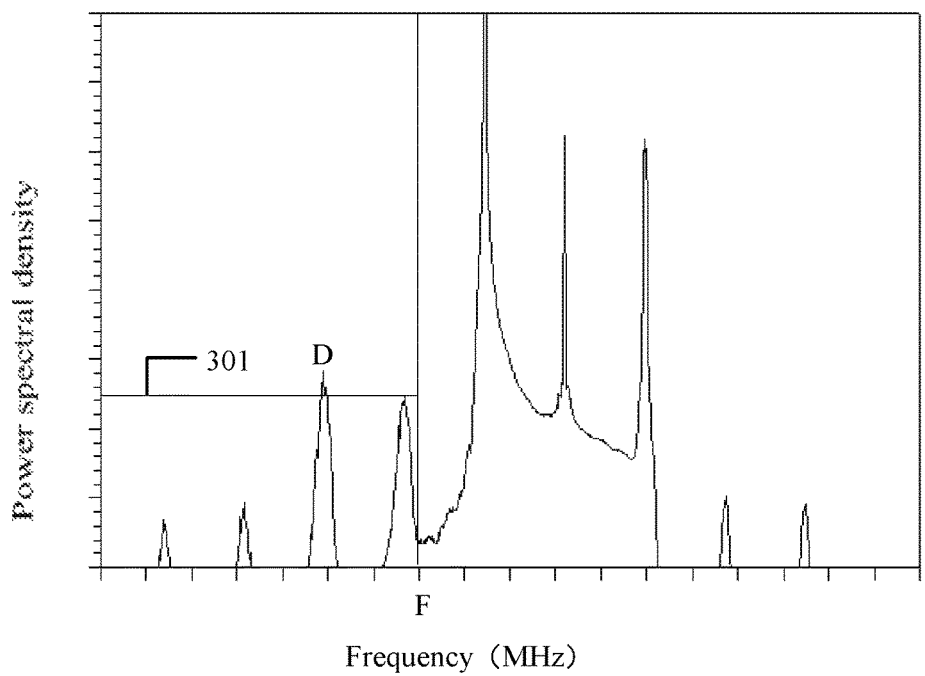
FIG. 3-a
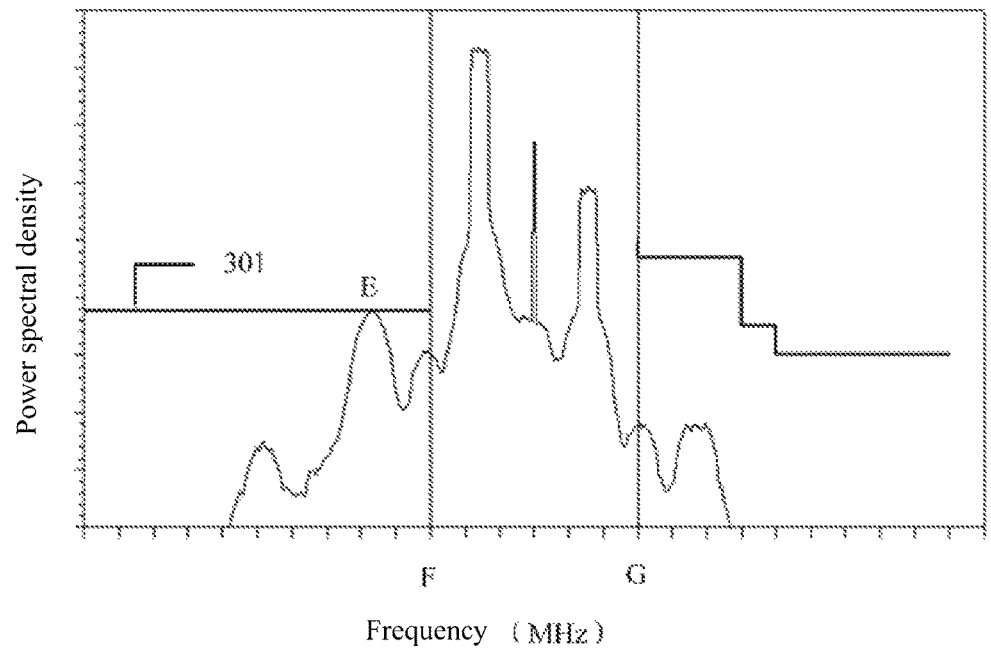
FIG. 3-b

METHOD FOR RESOURCE ALLOCATION AND BASE STATION

CROSS-REFERENCE TO RELATED APPLICATIONS

This application is a continuation of U.S. patent application Ser. No. 14/271,093, filed on May 6, 2014, now U.S. Pat. No. 9,826,521 B2, which is a continuation of International Application No. PCT/CN2012/084207, filed on Nov. 7, 2012. The International Application claims priority to Chinese Patent Application No. 201110348296.2, filed on Nov. 7, 2011. All of the afore-mentioned patent applications are hereby incorporated by reference in their entireties.

TECHNICAL FIELD

The present invention relates to the field of wireless communication and, in particular, to a method for resource allocation and a base station.

BACKGROUND

In the long term evolution (LTE, Long Term Evolution) standard, a method for allocating bandwidth resources in two dimensions of time domain and frequency domain is proposed with regard to the orthogonal frequency division multiplexing (OFDM, Orthogonal Frequency Division Multiplexing).

A bandwidth resource block, abbreviated as resource block (RB, Resource Block), is formed in the two dimensions of the time domain and the frequency domain. As for a system based on the OFDM, the RB is a smallest physical resource allocated to a user by the system. In the LTE, one RB is defined as a time of 14 OFDM symbols in the time domain, and a width of 12 sub-carriers in the frequency domain, where the interval of each sub-carrier is 15 KHz, thus the size of a smallest resource block allocated to a user is 14 (OFDM)*12 (sub-carriers).

In the prior art, a base station will divide allocatable bandwidth resources into resource blocks, and allocate the resource blocks to a user equipment (UE, User Equipment) in turn, the UE uses the resource blocks allocated by the base station to transmit and receive useful signals. However, in the LTE system, due to the imperfection of a UE, when a base station operates in adjacent frequency bands at the same time, coexisting interference will occur on UEs operating in two adjacent frequency bands, out-of-band radiation is generated easily when a UE transmits useful signals, where the out-of-band radiation includes out-of-band stray radiation and adjacent frequency radiation caused by modulation, and when a UE receives the useful signals, interference signals falling within a channel may cause the loss of receiving sensitivity of the UE and interference signals falling within a receiving bandwidth may cause a in-band blocking.

In order to ensure that a UE-to-UE interference will not engender obvious loss to performance of an interfered UE, the out-of-band radiation power spectral density of the UE needs to be limited, so that a maximum value of the out-of-band radiation power spectral density of the UE is less than a maximum value of the out-of-band radiation power spectral density allowed by an adjacent frequency band. In the prior art, in order to reduce the out-of-band radiation power spectral density of a UE, a base station will send a control signaling to all UEs within a system, requiring all the UEs within the system to reduce the maximum transmit power, so that the out-of-band radiation interference to the UE operating in adjacent frequency bands is reduced, however, the reduction of the maximum transmit power of all the UEs within the system will affect the uplink coverage scope of the system, which will make a great impact on network planning and is of less implementation.

SUMMARY

Embodiments of the present invention provide a method for resource allocation and a base station, used for allocating uplink transmission resource blocks to a UE by the base station, which can effectively reduce the out-of-band radiation power of the UE and improve the system performance.

A method for resource allocation is provided according to a first aspect of the present invention, including:
  determining, by a base station, a user equipment UE to which a resource block is to be allocated;
  if an index number of any one of allocated resource blocks of the UE falls within a preset first index number range, then judging whether the number of the allocated resource blocks of the UE is less than a preset first parameter value;
  if the number of the allocated resource blocks of the UE is less than the preset first parameter value, then raising a scheduling priority of the UE, so that a resource block to be allocated next time is allocated to the UE, or, deleting, from the allocated resource blocks of the UE, a resource block, an index number of which falls within the preset first index number range.

A method for resource allocation is provided according to an aspect of the present invention, including:
  when a base station has finished allocation of resource blocks to the UE, and allocated resource blocks of the UE include a resource block, an index number of which falls within a preset first index number range, judging whether the number of the allocated resource blocks of the UE is less than a preset first parameter value;
  if the number of the allocated resource blocks of the UE is less than the preset first parameter value, then judging whether an uplink transmit power value of the UE is greater than a preset transmit power value;
  if the uplink transmit power value of the UE is greater than the preset transmit power value, then sending a power control command to the UE, so that the transmit power value of the UE is reduced to the preset transmit power value.

A base station is provided according to an aspect of the present invention, including:
  an allocation unit, configured to determine a user equipment UE to which a resource block is to be allocated;
  a first judging unit, configured to, if an index number of any one of allocated resource blocks of the UE falls within a preset first index number range, then judging whether the number of the allocated resource blocks of the UE is less than a preset first parameter value;
  a first processing unit, configured to, if the number of the allocated resource blocks of the UE is less than the preset first parameter value, then raise a scheduling priority of the UE, so that a resource block to be allocated next time is allocated to the UE, or, delete, from the allocated resource blocks of the UE, a resource block, an index number of which falls within the preset first index number range.

A base station is provided according to an aspect of the present invention, including:
- a first parameter judging unit, configured to, when allocation of resource blocks to a UE has been finished, and allocated resource blocks of the UE include a resource block, an index number of which falls within a preset first index number range, judge whether the number of the allocated resource blocks of the UE is less than a preset first parameter value;
- a power judging unit, configured to, if the number of the allocated resource blocks of the UE is less than the preset first parameter value, then judge whether an uplink transmit power value of the UE is greater than a preset transmit power value;
- a sending unit, configured to, if the uplink transmit power value of the UE is greater than the preset transmit power value, then send a power control command to the UE, so that the transmit power value of the UE is reduced to the preset transmit power value.

It can be seen from the foregoing technical solutions that embodiments of the present invention have the following advantages:

When an index number of any one of allocated resource blocks of a UE falls within a preset first index number range, judging whether the number of the allocated resource blocks of the UE is less than a preset first parameter value, if yes, then raising the scheduling priority of the UE, so that a resource block to be allocated next is allocated to the UE, finally, the number of the allocated resource blocks of the UE can be greater than the preset first parameter value, thereby when the UE transmits signals, its out-of-band radiation fluctuation slows down and out-of-band radiation power spectral density decreases, satisfying that the maximum value of the out-of-band radiation power of the UE is less than the maximum value of the out-of-band radiation allowed by adjacent frequency bands of the UE, or, under the circumstance when the number of the allocated resource blocks of the UE is less than the preset first parameter value is determined, through deleting, from the allocated resource blocks of the UE, a resource block, the index number of which falls within the preset first index number range, the out-of-band radiation power spectral density generated by UE transmitting signals can be effectively reduced, so that the maximum value of the out-of-band radiation power spectral density of the UE is less than the maximum value of the out-of-band radiation power spectral density of the UE allowed by adjacent frequency bands.

BRIEF DESCRIPTION OF DRAWINGS

In order to make the technical solutions of embodiments of the present invention more clearly, the accompanying drawings used in the description of embodiments or the prior art are briefly described hereunder. The described drawings are merely some exemplary embodiments of present invention. For persons skilled in the art, other drawings may be obtained based on these drawings without any inventive work.

FIG. 3-a is a spectral power diagram according to an embodiment of the present invention;

FIG. 3-b is a spectral power diagram according to an embodiment of the present invention;

DESCRIPTION OF EMBODIMENTS

Embodiments of the present invention provide a method for resource allocation and a base station, used for allocating resources to a UE by a base station, so that the out-of-band radiation power of the UE is reduced, satisfying the requirement of a system on the out-of-band radiation power of the UE.

Figure 1:
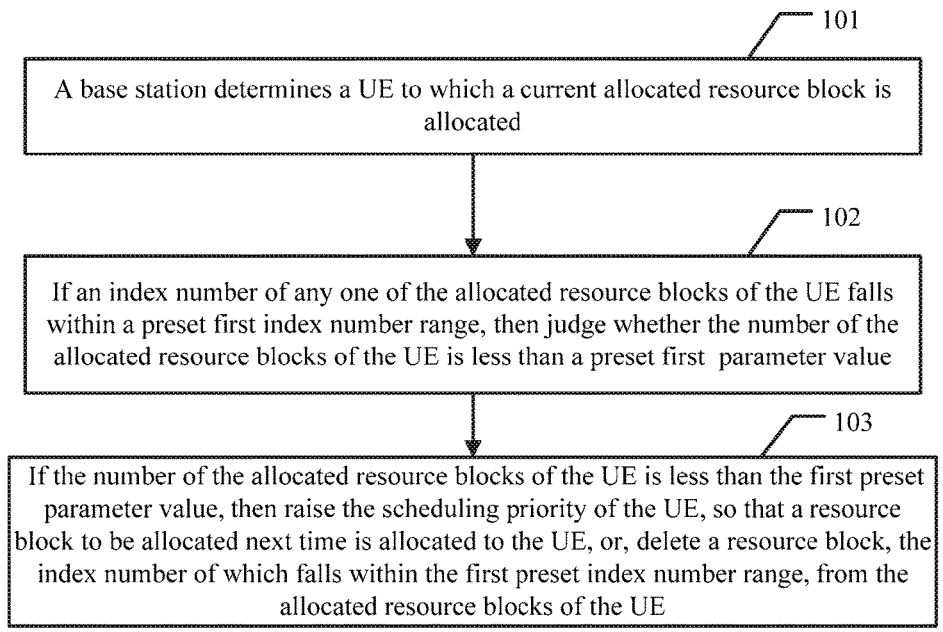
FIG. 1 is a schematic diagram of a method for resource allocation according to an embodiment of the present invention.

With reference to FIG. 1, an embodiment of a method for resource allocation according to an embodiment of the present invention includes:

101, a base station determines a UE to which a resource block is to be allocated;

In the embodiment of the present invention, the base station will divide bandwidth resources into resource blocks, set index numbers to the resource blocks in order, and allocate the resource blocks to the UE according to the index number in an order from small to large. The index number of the resource blocks divided by the base station may be as shown in FIG. 12.

Figure 12:
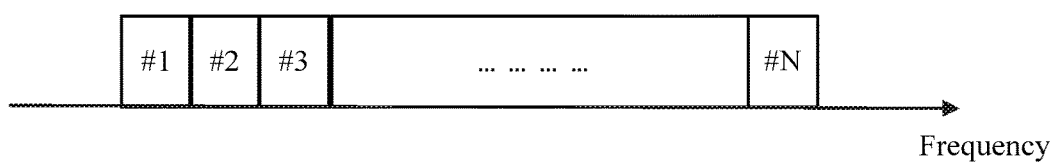
FIG. 12 is a schematic diagram of resource block index numbers divided by a base station corresponding to frequency bandwidths.

In FIG. 12, "#" represents the index number of a resource block, and #1 represents a resource block whose index number is 1.

In the embodiment of the present invention, the base station can determine the UE to which the resource block is to be allocated.

102, if an index number of any one of allocated resource blocks of the UE falls within a preset first index number range, then judge whether the number of the allocated resource blocks of the UE is less than a preset first parameter value;

In the embodiment of the present invention, when the index number of any one of the allocated resource blocks of the UE falls within the preset first index number range, the base station will judge whether the number of the allocated resource blocks of the UE is less than the preset first parameter value.

It should be noted that, in the embodiment of the present invention, the allocated resource blocks of the UE refer to uplink transmit resource blocks allocated to the UE by the base station.

Figure 2:
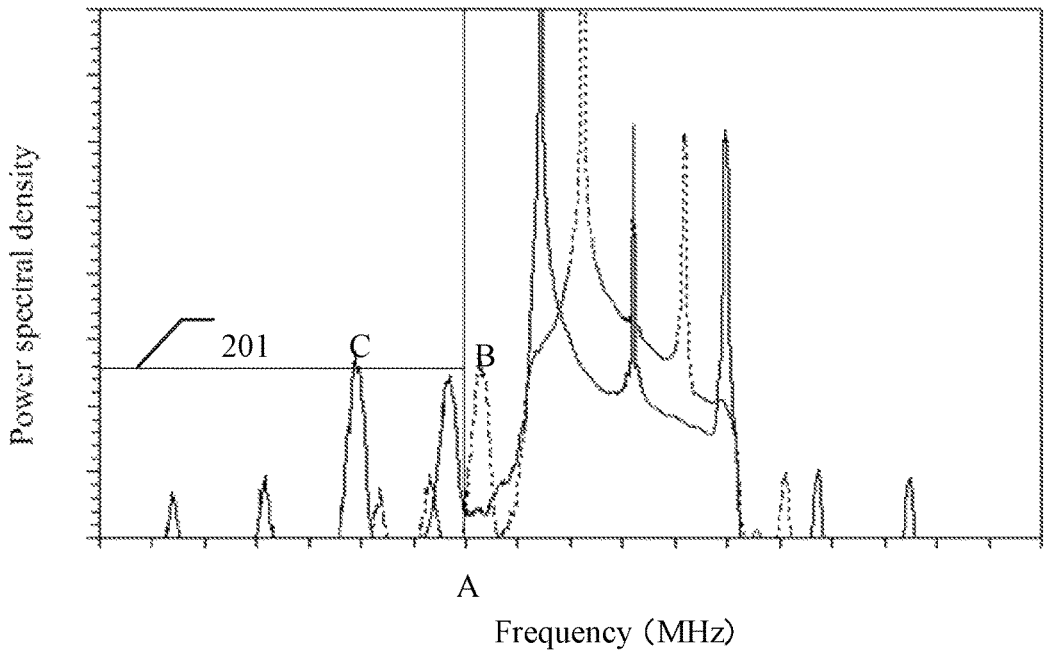
FIG. 2 is a spectral power diagram according to an embodiment of the present invention.

It should be noted that, in embodiment of the present invention, the preset first index number range can be determined through performing a stimulation experiment or a theoretical computation on to-be-transmitted signals of a UE to obtain, when the UE starts to transmit signals on different initial resource blocks, the peak position of the out-of-band radiation power spectral density. An initial resource block refers to a resource block among the allocated resource blocks of the UE, whose the index number is minimum, a peak position refers to a position where a maximum value of the generated out-of-band radiation power spectral density locates when the to-be-transmitted signals of the UE are carried in the allocated resource blocks of the UE to be transmitted. In the embodiment of the present invention, the preset first index number range is an index number range formed by the index numbers of initial resource blocks of the UE when peak positions of the out-of-band radiation power spectral density of the UE locates within the adjacent frequency bands of the UE. For example, if, when the index number of an initial resource block falls within an interval range from 1 to 21, the peak position of the out-of-band radiation power spectral density of a UE locates within the adjacent frequency bands of the UE, then the index number range of the UE is set as from 1 to 21, reference may be made to FIG. 2 for details, which takes a carrier with a bandwidth of 20 MHz for example, and shows a curve graph of the generated out-of-band radiation power spectral density when the initial resource block of the UE is different, according to an embodiment of the present invention. Where, the horizontal axis represents frequency and the vertical axis represents power spectral density, the frequency range greater than the frequency at point A is a frequency band range where the UE locates, the horizontal line 201 is a maximum value of the out-of-band radiation power spectral density of the UE allowed by an adjacent frequency band of the UE. The dotted curve represents a curve graph of power spectral density generated by the UE when the initial resource block is a resource block with an index number of 22, and point B is its peak position. The solid-line curve represents a curve graph of spectral density generated by the UE when the initial resource block is a resource block with an index number of 1, and point C is its peak position. In according to FIG. 2, when the initial resource block of a UE is changed from the resource block with an index number of 1 to the resource block with an index number of 22, the peak position of out-of-band radiation power spectral density of the UE is migrated from a frequency band of an interfered system to the frequency band range where the UE locates, thereby reducing the maximum value of the out-of-band radiation power spectral density of the UE within the adjacent frequency band, so that the out-of-band radiation power spectral density of the UE is less an allowed maximum value of the out-of-band radiation power spectral density.

In an embodiment of the present invention, a method for computing the peak position of the out-of-band radiation power spectral density of a UE may be: if the frequency point of an initial resource block of a UE is $f_1$, due to the imperfection of transmission radio frequency link of a UE, local oscillator leakages will be generated at a central frequency point $f_0$ of a carrier, and a mirror image will be generated at $(2f_1-f_0)$. After amplification of an amplifier, these signals will generate, outside the carrier channel, (p+q) times intermodulation products of $\pm(pf_1\pm qf_0)$, and it may be known through computation that the peak position of the UE locates at the frequency of $(3f_1-2f_0)$. Therefore, if the initial resource block of a UE is determined, the peak position of the out-of-band radiation power spectral density of the UE may be determined according to frequency band information of the initial resource block correspondingly.

It should be noted that, in an embodiment of the present invention, the first parameter value is relevant to the power of the power amplifier of UE, which may be obtained through a stimulation experiment or a theoretical measurement in practical application, and will not be limited thereto herein.

103, if the number of the allocated resource blocks of the UE is less than the preset first parameter value, then raise a scheduling priority of the UE, so that a resource block to be allocated next time is allocated to the UE, or, delete, from the allocated resource blocks of the UE, a resource block the index number of which falls within the preset first index number range.

In the embodiment of the present invention, if a base station determines that the number of the allocated resource blocks of a UE is less than the preset first parameter value, then the scheduling priority of the UE can be raised, so that a resource block to be allocated next time is allocated to the UE, or, the base station deletes a resource block, the index number of which falls within the preset first index number range, from the allocated resource blocks of the UE.

It should be noted that, in the embodiment of the present invention, the time consumed by the base station to allocate resource blocks to the UE may be shortened through increasing scheduling granularity values of resource allocation of the base station, where, the scheduling granularity refers to the number of the resource blocks allocated by the base station each time.

In the embodiment of the present invention, if the base station raises the scheduling priority of the UE, so that the base station can perform successive resource block allocations to the UE, more resource blocks will be allocated to the UE by the base station, so that the number of the allocated resource blocks of the UE finally may be greater than the preset first parameter value; in the embodiment of the present invention, when the number of the allocated resource blocks of the UE is greater than the preset first parameter value, the power spectral density of the UE will decrease, the out-of-band radiation power spectral density fluctuation slows down, the power spectral density at the peak position decreases, and the curve at the peak position widens. For a better understanding, please refer to FIG. 3-a and FIG. 3-b, which is, taking a carrier with a bandwidth of 20 MHz for example, a curve graph of power spectral density of a UE in an embodiment of the present invention, under the circumstance when the number of the allocated resource blocks of a UE is different, where FIG. 3-a represents a curve graph of power spectral density in the LTE system, when the number of the allocated resource blocks of the UE is less than the preset first parameter value, point D is its peak position; FIG. 3-b represents a curve graph of power spectral density, when the number of the allocated resource blocks of the UE is greater than the preset first parameter value, point E is its peak position. In FIGS. 3-a and 3-b, the horizontal line 301 is a maximum value of the out-of-band radiation power spectral density of the UE allowed by an adjacent frequency band of the UE, the frequency range between F and G is a frequency band where the UE locates.

In the embodiment of the present invention, the base station can also achieve the purpose of reducing the out-of-band radiation power spectral density of a UE through deleting from the allocated resource blocks of the UE, a resource block, the index number of which falls within the preset first index number range, where, the deleting a resource block, the index number of which falls within the preset first index number range, may cause an initial resource block of the UE to change, the index number of the initial resource block of the UE is increased, the peak position thereof will be located within a frequency band range where itself locates, the maximum value of the out-of-band radiation power spectral density of the UE is reduced. In order to better understand the technical solution, please refer to FIG. 2.

In the embodiment of the present invention, when an index number of any one of allocated resource blocks of a UE falls within the preset first index number range, after judging that the number of the allocated resource blocks of the UE is less than the preset first parameter value, through changing the scheduling priority of the UE or changing the initial resource block of the allocated resource blocks of the UE, the maximum value of the out-of-band radiation power spectral density of the UE can be effectively reduced, the interference to the adjacent frequency band is reduced, and the system performance is improved.

The embodiment as shown in FIG. 1 illustrates a method for resource allocation by a base station under the circumstances that an index number of any one of the allocated resource blocks of the UE falls within the preset first index number range, and the number of the allocated resource blocks of the UE is less than the preset first parameter value. Hereunder the method for resource allocation by a base station under the circumstances that an index number of any one of the allocated resource blocks of the UE falls within the preset first index number range, and the number of the allocated resource blocks of the UE is greater than the preset first parameter value will be described. Please refer to FIG. 4 which shows an embodiment of a method for resource allocation according to an embodiment of the present invention, including:

401, if the number of the allocated resource blocks of the UE is greater than the preset first parameter value, then judging whether the number of the allocated resource blocks of the UE is greater than a difference value between a preset second parameter value and a current scheduling granularity of the base station;

In the embodiment of the present invention, if the number of the allocated resource blocks of the UE is greater than the preset first parameter value, the base station will further judge whether the number of the allocated resource blocks of the UE is greater than the difference value between the preset second parameter value and the current scheduling granularity of the base station, where before performing the further judgment, the base station will also determine the second parameter value. In the embodiment of the present invention, the second parameter value is relevant to the initial resource block of the allocated resource blocks of the UE, the specific determining method is: the base station obtains the initial resource block of the allocated resource blocks of the UE, where the initial resource block refers to a resource block among the allocated resource blocks of the UE, the index number of which is minimum, then determines the second parameter value according to the index number of the initial resource block. Moreover, it should be noted that the bigger the index number of the initial resource block of the UE, then the bigger the determined second parameter value.

402, if the number of the allocated resource blocks of the UE is greater than the difference value between the preset second parameter value and the current scheduling granularity of the base station, then stop allocating resource blocks to the UE, or, delete, from the allocated resource blocks of the UE, a resource block, the index number of which falls within a preset second index number range, so that the base station continues to allocate resource blocks to the UE.

In the embodiment of the present invention, if the number of the allocated resource blocks of the UE is greater than the difference value between the preset second parameter value and the current scheduling granularity of the base station, then the base station will stop allocating resource blocks to the UE, or, delete, from the allocated resource blocks of the UE, a resource block, the index number of which falls within the preset second index number range, so that the index number of the initial resource block of the UE is increased to obtain a new second parameter value, so that the base station continues to allocate resource blocks to the UE.

It should be noted that, in the embodiment of the present invention, the second index number range is relevant to the number of resource blocks actually required by the UE, and in practical application the second index number range of the UE can be determined through a stimulation experiment, where, the number of resource blocks actually required by the UE refers to the number of resource blocks required by the UE which is calculated by the base station according to the parameter in a resource block request message sent by the UE.

Figure 5:
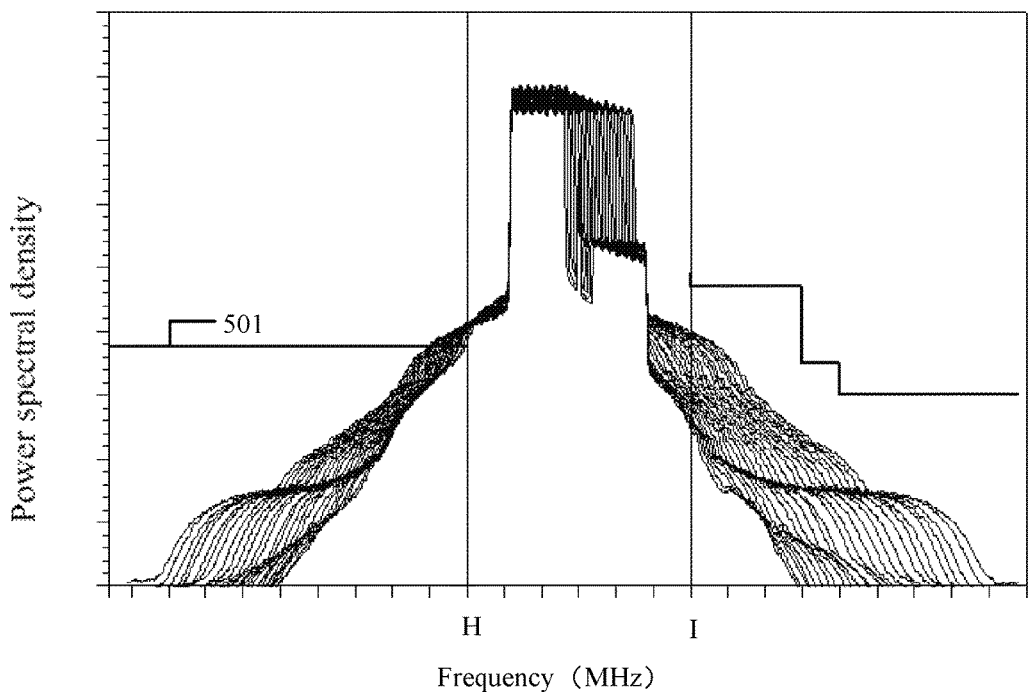
FIG. 5 is a spectral power diagram according to an embodiment of the present invention.

In an embodiment of the present invention, when the number of the allocated resource blocks of the UE is greater than the difference value between the preset second parameter value and the current scheduling granularity of the base station, the base station stops allocating resource blocks to the UE, so as to avoid the number of the allocated resource blocks of the UE being greater than or equal to the second parameter value, preventing that the maximum value of the out-of-band radiation power spectral density of the UE goes beyond the maximum value of the out-of-band radiation power spectral density of the UE allowed by the adjacent frequency bands. Please refer to FIG. 5, taking a carrier with a bandwidth of 20 MHz for example, showing a composite graph for all the power spectral density curves of the UE, under the circumstances that the base station includes 100 resource blocks, the number of the allocated resource blocks of the UE falls in an interval from the second parameter value to 100. The frequency band between H and I is the frequency band where the UE locates, the horizontal line 501 represents the maximum value of the out-of-band radiation power spectral density of the UE allowed by the adjacent frequency band of the UE. It can be seen obviously from FIG. 5 when the number of the allocated resource blocks of the UE falls within an interval from the second parameter value to 100, the maximum value of the out-of-band radiation power spectral density of the UE will exceed the maximum value allowed by the adjacent frequency band, the system performance is affected. Therefore, in the embodiment of the present invention, when the number of the allocated resource blocks of the UE is greater than the difference value between the preset second parameter value and the current scheduling granularity of the base station, resource allocation to the UE needs to be stopped.

Figure 6:
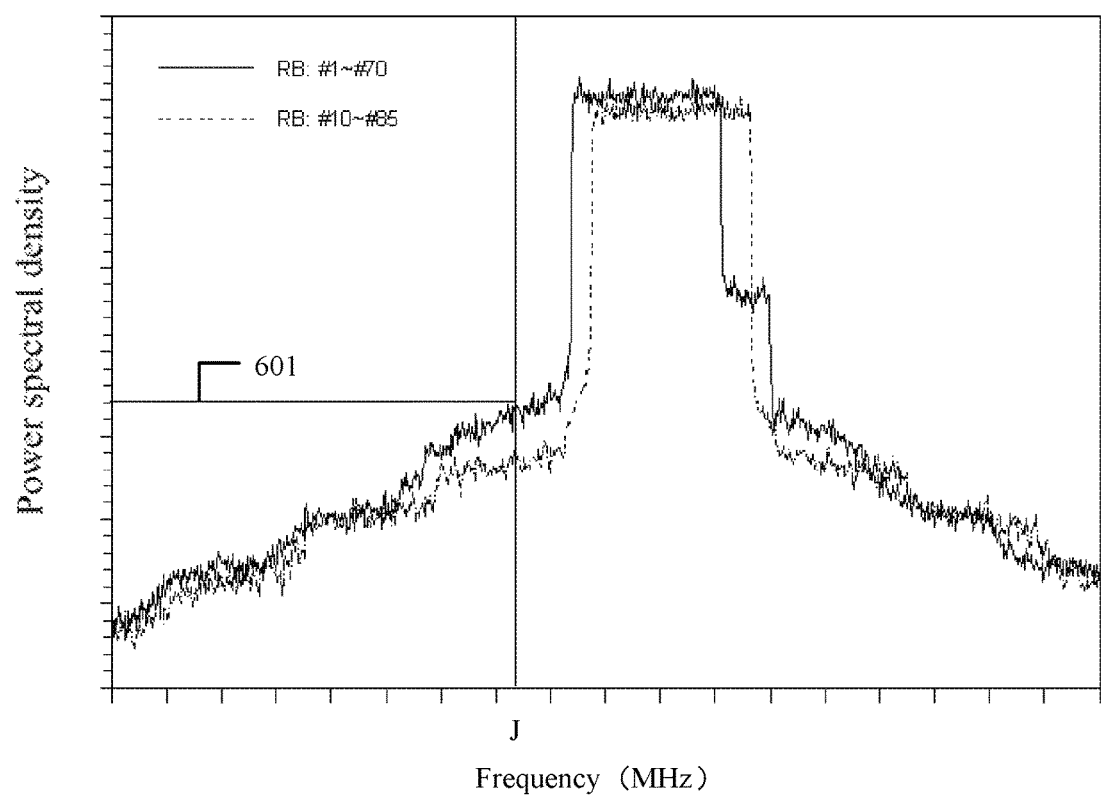
FIG. 6 is a spectral power diagram according to an embodiment of the present invention.

In an embodiment of the present invention, when the number of the allocated resource blocks of the UE is greater than the difference value between the preset second parameter value and the current scheduling granularity of the base station, the base station can also delete, from the allocated resource blocks of the UE, a resource block the index number of which falls within the preset second index number range, in such case, the index number of the initial resource block of the UE will be increased, the second parameter value of the UE will be changed, the base station can continue to allocate resources to the UE, and the maximum value of the out-of-band radiation power spectral density generated by the UE within the adjacent frequency band can be effectively reduced. Please refer to FIG. 6, taking a carrier with a bandwidth of 20 MHz for example, the solid-line curve represents a curve graph of the out-of-band radiation power spectral density of the UE, when the initial resource block of the UE is a resource block with an index number of 1 and the second parameter value is 70; the dotted curve represents a curve graph of the out-of-band radiation power spectral density of the UE, when the initial resource block of the UE is a resource block with an index number of 10 and the second parameter value is 80; the horizontal line 601 is the maximum value of the out-of-band radiation power spectral density of the UE allowed by the adjacent frequency band of the UE, the frequency J is a frequency of the boundary point between the UE with the adjacent frequency band.

In the embodiment of the present invention, when the number of the allocated resource blocks of the UE is greater than the preset second parameter value, through stopping continuing to allocate resources to the UE, or changing the initial resource block of the UE, the maximum value of the out-of-band radiation power spectral density of the UE can be ensured to be less than the maximum value of the out-of-band radiation of the UE allowed by the adjacent frequency band.

It should be noted that, in the embodiment of the present invention, the out-of-band radiation interference of the UE to the adjacent frequency band which is less than the frequency band range where the UE locates is taken as an example for illustration, in practical application, the UE may also have a adjacent frequency band the frequency band range of which is greater than the frequency band where the UE locates. As for such case, a method similar to the embodiments as shown in FIG. 1 and FIG. 4 of the present invention may also be employed to perform resource allocation, to reduce the maximum value of the out-of-band radiation power spectral density of the UE, which will not be repeated herein.

Figure 4:
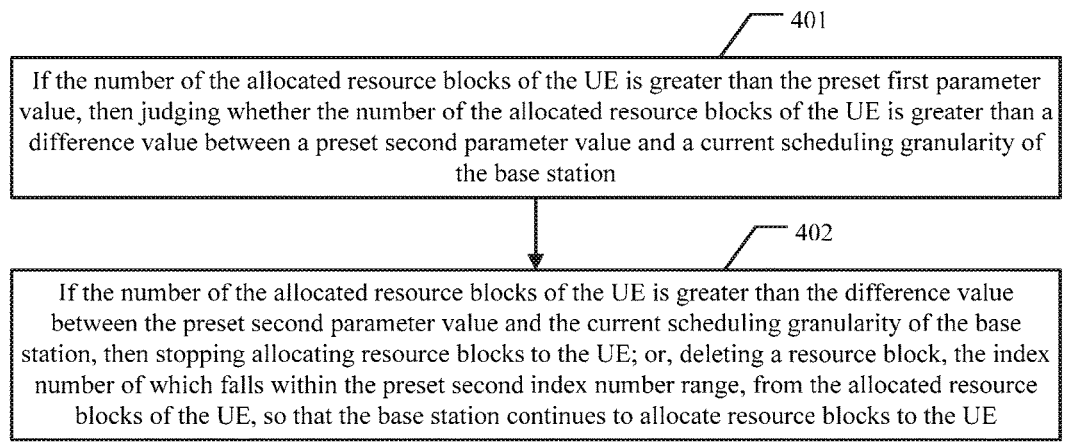
FIG. 4 is another schematic diagram of a method for resource allocation according to an embodiment of the present invention.

In embodiments of the present invention, the embodiments as shown in FIG. 1 and FIG. 4 describe that the base station makes an adjustment to the number of the allocated resource blocks of the UE and to the initial resource block during a process of resource allocation, so as to achieve the purpose of reducing the maximum value of the out-of-band radiation power spectral density of the UE. Hereunder will describe a method for realizing reduction of the out-of-band radiation power spectral density of the UE after the base station finishes resource allocation to the UE via a method of the prior art. Please refer to FIG. 7, an embodiment of a method for resource allocation according to an embodiment of the present invention includes:

701, when a base station has finished allocation of resource blocks to a UE, and allocated resource blocks of the UE include a resource block, an index number of which falls within a preset first index number range, judge whether the number of the allocated resource blocks of the UE is less than a preset first parameter value;

702, if the number of the allocated resource blocks of the UE is less than the preset first parameter value, then judge whether an uplink transmission power value of the UE is greater than a preset transmit power value;

703, if the uplink transmission power value of the UE is greater than the preset transmission power value, then send a power control command to the UE, so that the transmission power value of the UE is reduced to the preset transmit power value.

In the embodiment of the present invention, if the base station finishes the allocation of resource blocks to the UE according to a method in the prior art, and the allocated resource blocks of the UE include a resource block, an index number of which falls within a preset range, the base station will judge whether the number of the allocated resource blocks of the UE is less than the preset first parameter value. If the number of the allocated resource blocks of the UE is less than the preset first parameter value, then the base station will further judge whether the uplink transmission power value of the UE is greater than the preset transmit power value; if the uplink transmission power value of the UE is less than the preset first parameter value, the base station will send a control command to the UE, so that the transmission power value of the UE is reduced to the preset transmit power value. It should be noted that, in the embodiment of the present invention, the preset transmission power value is relevant to the number of the allocated resource blocks of the UE, which may be obtained according to a specific stimulation or measurement in practical application.

It should be noted that, in the embodiment of the present invention, the base station may also cancel resource allocation to the UE, so as to avoid the out-of-band radiation power spectral density generated by the UE is greater than the maximum value of the out-of-band radiation power spectral density of the UE allowed by the adjacent frequency bands of the UE.

In the embodiment of the present invention, if the allocated resource blocks of the UE include a resource block, an index number of which falls within the preset index number range, and the number of the allocated resource blocks of the UE is greater than the preset first parameter value, through sending a power control command to the UE, the transmission power value of the UE can be reduced to the preset transmit power value, the maximum value of the out-of-band radiation power spectral density of the UE can be effectively reduced.

Figure 7:
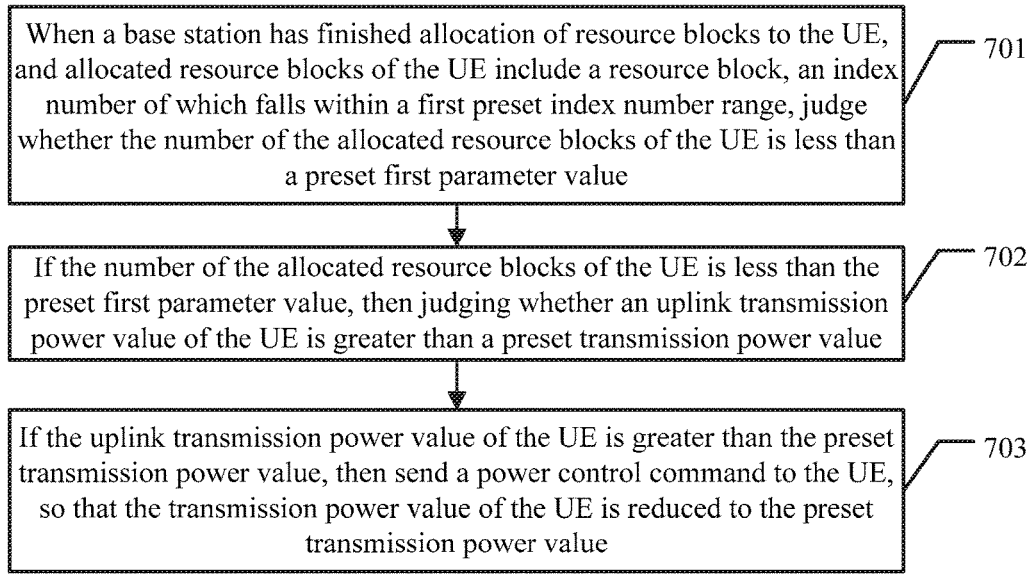
FIG. 7 is a schematic diagram of a method for resource allocation according to an embodiment of the present invention.
Figure 8:
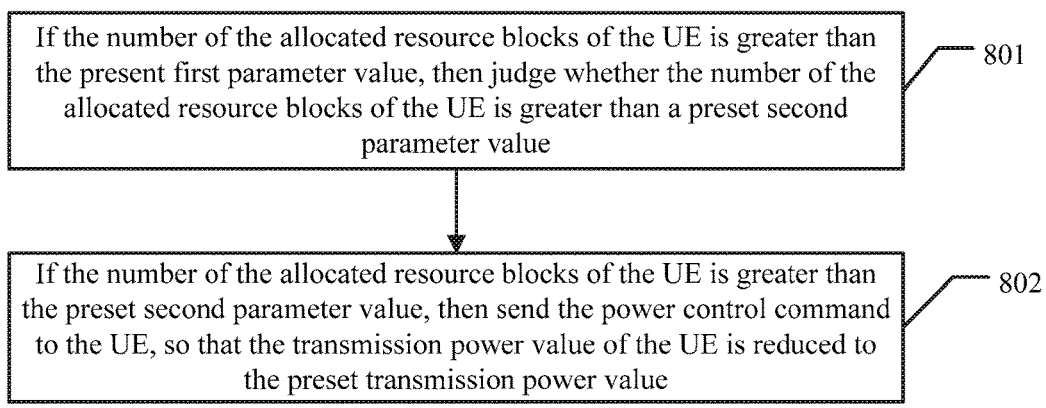
FIG. 8 is another schematic diagram of a method for resource allocation according to an embodiment of the present invention.

In the embodiment as shown in FIG. 7, a method for resource allocation of a base station, when the number of the allocated resource blocks of the UE is less than the preset first parameter value is described. Hereunder will describe a method for resource allocation of a base station when the number of the allocated resource blocks of the UE is greater than the preset first parameter value. Please refer to FIG. 8 which shows an embodiment of a method for resource allocation according to an embodiment of the present invention, including:

801, if the number of the allocated resource blocks of the UE is greater than the preset first parameter value, then judge whether the number of the allocated resource blocks of the UE is greater than a preset second parameter value;

802, if the number of the allocated resource blocks of the UE is greater than the preset second parameter value, then send the power control command to the UE, so that the transmission power value of the UE is reduced to the preset transmission power value.

In the embodiments of the present invention, according to the embodiment as shown in FIG. 7, if the number of the allocated resource blocks of the UE is greater than the preset first parameter value, the base station will judge whether the number of the allocated resource blocks of the UE is greater than the preset second parameter value; when the number of the allocated resource blocks of the UE is greater than the preset second parameter value, the base station will send the power control command to the UE, so that the transmission power value of the UE is reduced to the preset transmission power value.

In the embodiment of the present invention, when the number of the allocated resource blocks of the UE is greater than the preset second parameter value, the maximum value of the out-of-band radiation power spectral density generated by the UE may be reduced through reducing the transmission power value of the UE, so that the maximum value of the out-of-band radiation power spectral density thereof is less than the maximum value of the out-of-band radiation power spectral density of the UE allowed by the adjacent frequency bands, and the system performance is improved.

Figure 9:
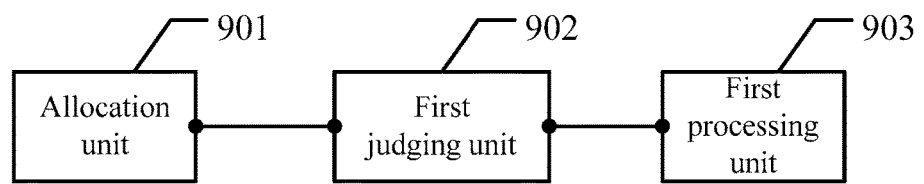
FIG. 9 is a schematic diagram of a resource allocation device according to an embodiment of the present invention.

Please refer to FIG. 9 for an embodiment of a base station according to an embodiment of the present invention, including:
an allocation unit 901, configured to determine a user equipment UE to which a resource block is to be allocated;
a first judging unit 902, configured to, if an index number of any one of the allocated resource blocks of the UE falls within a preset first index number range, then judge whether the number of allocated resource blocks of the UE is less than a preset first parameter value;
a first processing unit 903, configured to, if the number of the allocated resource blocks of the UE is less than the preset first parameter value, then raise a scheduling priority of the UE, so that a resource block to be allocated next time is allocated to the UE, or, delete, from the allocated resource blocks of the UE, a resource block the index number of which falls within the preset first index number range.

In the embodiment of the present invention, after the allocation unit 901 determines the user equipment UE to which a resource block is to be allocated, if the index number of any one of the allocated resource blocks of the UE falls within the preset index range, the first judging unit 902 will judge whether the number of the allocated resource blocks is less than the preset first parameter value, if the number of the allocated resource blocks of the UE is less than the preset first parameter value, the first processing unit 903 will raise the scheduling priority of the UE, so that the resource block to be allocated next time is allocated to the UE, or, delete, from the allocated resource blocks of the UE, a resource block, the index number of which falls within the preset first index number range.

In the embodiment of the present invention, when the index number of any one of allocated resource blocks of a UE falls within the preset first index number range, after judging that the number of the allocated resource blocks of the UE is less than the preset first parameter value, through changing the scheduling priority of the UE or changing the initial resource block of the allocated resource blocks of the UE, the maximum value of the out-of-band radiation power spectral density of the UE can be effectively reduced, the interference to the adjacent frequency bands of the UE is reduced, and the system performance is improved.

Figure 10:
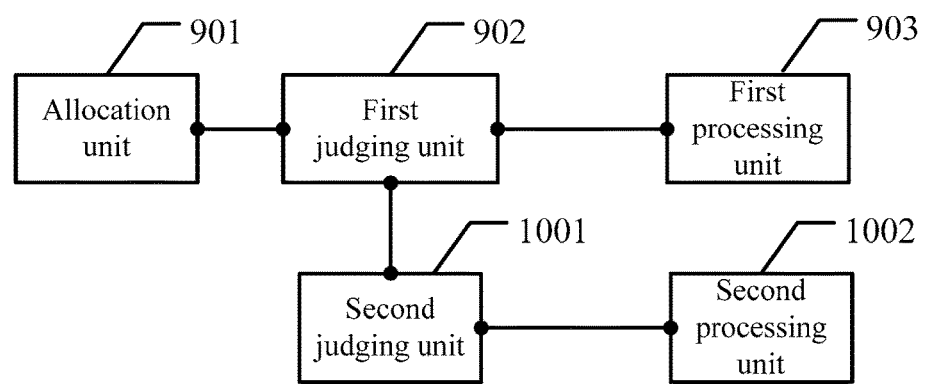
FIG. 10 is a schematic diagram of a resource allocation device according to an embodiment of the present invention.

In order to better understand the base station shown in FIG. 9, please refer to FIG. 10 for an embodiment of a base station according to embodiments of the present invention, including:
The allocation unit 901, the first judging unit 902, the first processing unit 903 of the embodiment shown in FIG. 9, which are the same with the content as described in the embodiment shown in FIG. 9, and will not be repeated herein.

The base station in the embodiment of the present invention further includes:
a second judging unit 1001, configured to, if the number of the allocated resource blocks of the UE is greater than the preset first parameter value, then judge whether the number of the allocated resource blocks of the UE is greater than a difference value between a preset second parameter value and a current scheduling granularity of the base station;
a second processing unit 1002, configured to, if the number of the allocated resource blocks of the UE is greater than the difference value between the preset second parameter value and the current scheduling granularity of the base station, then stop allocating resource blocks to the UE; or, delete, from the allocated resource blocks of the UE, a resource block, the index number of which falls within a preset second index number range, so that the base station continues to allocate resource blocks to the UE.

In the embodiment of the present invention, after the allocation unit 901 determines the user equipment UE to which the resource block is to be allocated, if the index number of any one of the allocated resource blocks of the UE falls within the preset index range, the first judging unit 902 will judge whether the number of the allocated resource blocks is less than the preset first parameter value, if the number of the allocated resource blocks of the UE is less than the preset first parameter value, the first processing unit 903 will raise the scheduling priority of the UE, so that the resource block to be allocated next time is allocated to the UE, or, delete, from the allocated resource blocks of the UE, a resource block the index number of which falls within the preset first index number range; if the number of the allocated resource blocks of the UE is greater than the preset first parameter value, the second judging unit 1001 will judge whether the number of the allocated resource blocks of the UE is greater than the difference value between the preset second parameter value and the current scheduling granularity of the base station, if the number of the allocated resource blocks of the UE is greater than the difference value between the preset second parameter value and the current scheduling granularity of the base station, then the second processing unit 1002 will stop allocating resource blocks to the UE, or, delete, from the allocated resource blocks of the UE, a resource block the index number of which falls within the preset second index number range, so that the base station continues to allocate resource blocks to the UE.

In the embodiment of the present invention, through comparing the number of the allocated resource blocks of the UE with the preset first parameter value and the preset second parameter value, and making adjustment to the resource blocks allocated to the UE according to the comparing result, the maximum value of the out-of-band radiation power spectral density of the UE can be effectively reduced, so that a requirement of the out-of-band radiation power spectral density of the UE allowed by the adjacent frequency bands is satisfied, and the system performance is improved.

Figure 11:
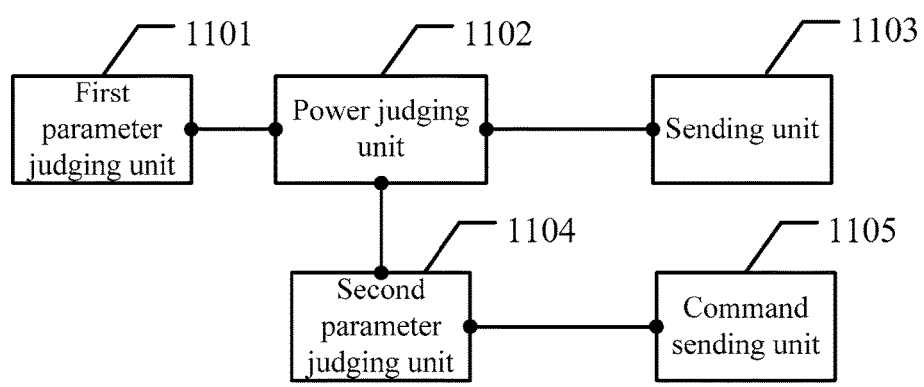
FIG. 11 is a schematic diagram of a resource allocation device according to an embodiment of the present invention.

Please refer to FIG. 11 for an embodiment of a base station according to embodiments of the present invention, including:
a first parameter judging unit 1101, configured to, when the allocation of resource blocks to a UE has been finished, and the allocated resource blocks of the UE include a resource block an index number of which falls within a preset first index number range, judge whether the number of allocated resource blocks of the UE is less than a preset first parameter value;

a power judging unit 1102, configured to, if the number of the allocated resource blocks of the UE is less than the preset first parameter value, then judge whether an uplink transmission power value of the UE is greater than a preset transmission power value;

a sending unit 1103, configured to, if the uplink transmission power value of the UE is greater than the preset transmission power value, then send a power control command to the UE, so that the transmission power value of the UE is reduced to the preset transmission power value.

Preferably, in an embodiment of the present invention, the base station can also include:

a second parameter judging unit 1104, configured to, if the number of the allocated resource blocks of the UE is greater than the preset first parameter value, then judge whether the number of the allocated resource blocks of the UE is greater than a preset second parameter value;

a command sending unit 1105, configured to, if the number of the allocated resource blocks of the UE is greater than the preset second parameter value, then send the power control command to the UE, so that the transmit power value of the UE is reduced to the preset transmit power value.

In the embodiment of the present invention, when the allocation of resource blocks to a UE has been finished, and the allocated resource blocks of the UE include a resource block, an index number of which falls within a preset index range, the first parameter judging unit 1101 judges whether the number of the allocated resource blocks of the UE is less than the preset first parameter value, if the number of the allocated resource blocks of the UE is less than the preset first parameter value, then the power judging unit 1102 judges whether the uplink transmission power value of the UE is greater than the preset transmission power value, if the uplink transmission power value of the UE is greater than the preset transmission power value, then the sending unit 1103 sends a power control command to the UE, so that the transmission power value of the UE is reduced to the preset transmission power value. Furthermore, in the embodiment of the present invention, if the number of the allocated resource blocks of the UE is greater than the preset first parameter value, then the second parameter judging unit 1104 judges whether the number of the allocated resource blocks of the UE is greater than the preset second parameter value, if the number of the allocated resource blocks of the UE is greater than the preset second parameter value, the command sending unit 1105 sends the power control command to the UE, so that the transmission power value of the UE is reduced to the preset transmission power value.

In the embodiment of the present invention, if, the allocated resource blocks of the UE include a resource block, an index number of which falls within a preset index number range, and the number of the allocated resource blocks of the UE is greater than the preset first parameter value, the transmission power value of the UE can be reduced to the preset transmission power value by sending the power control command to the UE. When the number of the allocated resource blocks of the UE is greater than the preset second parameter value, the maximum value of the out-of-band radiation power spectral density generated by the UE may be reduced by reducing the transmission power value of the UE, so that the maximum value of the out-of-band radiation power spectral density thereof is less than the maximum value of the out-of-band radiation power spectral density of the UE allowed by the adjacent frequency bands, and the system performance is improved.

Persons of ordinary skill in the art may understand that all or a part of the steps of the methods according to the above embodiments of the present invention may be implemented by a program instructing relevant hardware. The program may be stored in a computer readable storage medium. The above-mentioned storage medium may be a read-only memory, a magnetic disk, or an optical disk, etc.

The above describes in detail about the method for resource allocation and the base station provided in the embodiments of present invention. For ordinary persons skilled in the art, modifications to the specific implementing mode and application scope may be made based on the principles of the embodiments of the present invention. In conclusion, the contents of the description should not be interpreted as limitations to the present invention.

What is claimed is:

1. A method for resource allocation, comprising:
   determining, by a base station, a user equipment (UE) to which a resource block is to be allocated;
   determining whether an index number of any resource block allocated to the UE falls within a preset first index number range;
   determining, in response to determining that the index number of any resource block allocated to the UE falls within the preset first index number range, whether a number of resource blocks allocated to the UE is less than a preset first value; and
   in response to determining that the number of resource blocks allocated to the UE is less than the preset first value:
      raising a scheduling priority of the UE, such that a next resource block to be allocated will be allocated to the UE; or
      deleting an allocation of a resource block allocated to the UE having an index number that falls within the preset first index number range;
   wherein when the number of resource blocks allocated to the UE is greater than the preset first value, a power spectral density of the UE decreases, an out-of-band radiation power spectral density fluctuation slows down, the power spectral density at a peak position decreases, and a curve at the peak position widens.

2. The method according to claim 1, wherein the method further comprises:
   increasing, by the base station, a scheduling granularity value.

3. The method according to claim 1, the method further comprising:
   determining, in response to determining that the number of resource blocks allocated to the UE is greater than the preset first value, whether the number of resource blocks allocated to the UE is greater than a difference value between a preset second value and a current scheduling granularity of the base station; and
   in response to determining that the number of resource blocks allocated to the UE is greater than the difference value:
      stopping allocation of resource blocks to the UE; or
      deleting an allocation of a resource block allocated to the UE having an index number that falls within a preset second index number range, such that the base station can continue to allocate resource blocks to the UE.

4. The method according to claim 3, wherein before determining whether the number of resource blocks allocated to the UE is greater than the difference value, the method further comprises:
 determining an initial resource block allocated to the UE, wherein the initial resource block allocated to the UE has the lowest index number of any resource block allocated to the UE; and
 determining the preset second value according to the index number of the initial resource block allocated to the UE.

5. A base station, comprising a processor and a storage medium storing instructions for execution by the processor such that, when the instructions are executed, the processor is configured to perform operations of:
 determining a user equipment (UE) to which a resource block is to be allocated;
 determining whether an index number of any resource block allocated to the UE falls within a preset first index number range;
 determining, in response to determining that the index number of any resource block allocated to the UE falls within the preset first index number range, whether a number of resource blocks allocated to the UE is less than a preset first value; and
 in response to determining that the number of resource blocks allocated to the UE is less than the preset first value: raising a scheduling priority of the UE, such that a next resource block to be allocated will be allocated to the UE; or deleting an allocation of a resource block allocated to the UE having an index number that falls within the preset first index number range;
 wherein when the number of resource blocks allocated to the UE is greater than the preset first value, a power spectral density of the UE decreases, an out-of-band radiation power spectral density fluctuation slows down, the power spectral density at a peak position decreases, and a curve at the peak position widens.

6. The base station according to claim 5, wherein the processor is further configured to perform operations of:
 increasing, by the base station, a scheduling granularity value.

7. The base station according to claim 5, wherein the processor is further configured to perform operations of:
 determining, in response to determining that the number of resource blocks allocated to the UE is greater than the preset first value, whether the number of resource blocks allocated to the UE is greater than a difference value between a preset second value and a current scheduling granularity of the base station; and
 in response to determining that the number of resource blocks allocated to the UE is greater than the difference value: stopping allocation of resource blocks to the UE; or deleting an allocation of a resource block allocated to the UE having an index number that falls within a preset second index number range, such that the base station can continue to allocate resource blocks to the UE.

8. The base station according to claim 7, wherein the processor is further configured to perform operations of:
 before determining whether the number of resource blocks allocated to the UE is greater than the difference value:
 determining an initial resource block allocated to the UE, wherein the initial resource block allocated to the UE has the lowest index number of any resource block allocated to the UE; and
 determining the preset second value according to the index number of the initial resource block allocated to the UE.

9. A non-transitory computer-readable storage medium comprising instructions which, when executed by a base station, causes the base station to perform operations comprising:
 determining a user equipment (UE) to which a resource block is to be allocated;
 determining whether an index number of any resource block allocated to the UE falls within a preset first index number range;
 determining, in response to determining that the index number of any resource block allocated to the UE falls within the preset first index number range, whether a number of resource blocks allocated to the UE is less than a preset first value; and
 in response to determining that the number of resource blocks allocated to the UE is less than the preset first value:
 raising a scheduling priority of the UE, such that a next resource block to be allocated will be allocated to the UE; or
 deleting an allocation of a resource block allocated to the UE having an index number that falls within the preset first index number range;
 wherein when the number of resource blocks allocated to the UE is greater than the preset first value, a power spectral density of the UE decreases, an out-of-band radiation power spectral density fluctuation slows down, the power spectral density at a peak position decreases, and a curve at the peak position widens.

10. The non-transitory computer-readable storage medium according to claim 9, wherein the operations further comprise:
 increasing a scheduling granularity value.

11. The non-transitory computer-readable storage medium according to claim 9, wherein the operations further comprise:
 determining, in response to determining that the number of resource blocks allocated to the UE is greater than the preset first value, whether the number of resource blocks allocated to the UE is greater than a difference value between a preset second value and a current scheduling granularity of the base station; and
 in response to determining that the number of resource blocks allocated to the UE is greater than the difference value:
 stopping allocation of resource blocks to the UE; or
 deleting an allocation of a resource block allocated to the UE having an index number that falls within a preset second index number range, such that the base station can continue to allocate resource blocks to the UE.

12. The non-transitory computer-readable storage medium according to claim 11, wherein the operations further comprise:
 before determining whether the number of resource blocks allocated to the UE is greater than the difference value:
 determining an initial resource block allocated to the UE, wherein the initial resource block allocated to the UE has the lowest index number of any resource block allocated to the UE; and determining the preset second value according to the index number of the initial resource block allocated to the UE.

* * * * *